United States Patent
Tanaka et al.

(10) Patent No.: US 7,097,682 B2
(45) Date of Patent: Aug. 29, 2006

(54) VENTILATION FILTER MEDIUM FOR CONTAINER, AND CONTAINER AND CONTAINER CAP EQUIPPED WITH VENTILATION FILTER MEDIUM

(75) Inventors: Osamu Tanaka, Settsu (JP); Hideki Aomi, Osaka (JP); Hideyuki Kiyotani, Settsu (JP); Yoshiyuki Shibuya, Settsu (JP); Seiichi Hirano, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 77 days.

(21) Appl. No.: 10/491,812

(22) PCT Filed: Oct. 11, 2002

(86) PCT No.: PCT/JP02/10628

§ 371 (c)(1),
(2), (4) Date: Apr. 6, 2004

(87) PCT Pub. No.: WO03/032711

PCT Pub. Date: Apr. 24, 2003

(65) Prior Publication Data
US 2004/0237802 A1    Dec. 2, 2004

(30) Foreign Application Priority Data
Oct. 11, 2001   (JP)   ............... 2001-313620

(51) Int. Cl.
*B01D 19/00* (2006.01)
(52) U.S. Cl. .............. 55/385.4; 55/385.1; 55/524; 55/527; 55/309; 55/522; 96/13; 96/14; 215/261; 215/329; 215/351
(58) Field of Classification Search ............... 55/385.4, 55/385.1, 524, 527, DIG. 30, 309, 522; 96/13, 96/14; 215/261, 329, 351
See application file for complete search history.

(56) References Cited

U.S. PATENT DOCUMENTS

| 3,071,276 | A | * | 1/1963 | Pellett et al. ............... 215/261 |
| 5,910,277 | A | | 6/1999 | Ishino et al. |
| 5,914,415 | A | * | 6/1999 | Tago ........................ 55/385.4 |
| 2003/0126843 | A1 | * | 7/2003 | Hsu ........................ 55/385.4 |
| 2004/0025693 | A1 | * | 2/2004 | Bedingfield et al. ......... 95/273 |

FOREIGN PATENT DOCUMENTS

| JP | 57-129614 | 8/1982 |
| JP | 3-504876 | 10/1991 |
| JP | 2001-170461 | 6/2001 |
| KR | 8300213 U | 2/1983 |

* cited by examiner

*Primary Examiner*—Duane Smith
*Assistant Examiner*—Minh-Chau T. Pham
(74) *Attorney, Agent, or Firm*—Global IP Counselors

(57) ABSTRACT

The present invention provides a culture container and a cap for a container having a ventilation filter medium or a medium similar thereto that can exchange carbon dioxide gas in the culture container with atmospheric air, and prevent the contamination of sterilized culture medium inside the culture container with fungi, mites, and the like. A culture bottle includes a bottle unit, and a cap that is mounted on an opening. The cap includes a cap unit, and a ventilation filter medium. A hole is provided in the cap unit. The ventilation filter medium includes a plurality of micropores having a pore diameter between 0.1 and 50 micrometers, and is mounted on the hole.

4 Claims, 4 Drawing Sheets

VENTILATION FILTER MEDIUM FOR CONTAINER, AND CONTAINER AND CONTAINER CAP EQUIPPED WITH VENTILATION FILTER MEDIUM

TECHNICAL FIELD

The present invention relates to a ventilation filter medium for a container, and more particularly to a ventilation filter medium for a culture container that is employed to artificially culture mushrooms.

BACKGROUND ART

Wide mouth plastic culture bottles or plastic bags are employed as containers for culturing edible mushrooms such as enoki mushrooms, beech mushrooms (bunashimeji), shiitake mushrooms, and the like.

When culture bottles are employed, these mushrooms can be cultured in the following way. First, the culture bottles are filled with culture medium, a cap having a filter is mounted on each culture bottle, and the bottles are then subjected to high-temperature sterilization. After the sterilization process, the culture bottles are cooled, the caps are removed after cooling and the culture medium is inoculated with inoculum, and the caps are again mounted on the bottles and the inoculum is cultured for a predetermined period of time. The caps are removed at the end of the culturing period, fruiting bodies are allowed to grow from the culture medium, and the mushrooms are harvested at the point in which they have attained a predetermined size.

A ventilation filter is placed in the cap mounted on the culture bottle or in the culture bag. The ventilation filter functions to prevent other fungi from contaminating the culture medium inside the culture container, and to exchange the carbon dioxide gas ($CO_2$) generated from the mushrooms during the cultivation period with atmospheric air. The gas exchange characteristics of the ventilation filter is a big problem, particularly with respect to enoki mushrooms and the like, because they have a low tolerance to carbon dioxide gas and the ventilatory frequency of the carbon dioxide gas will have a conspicuous impact on culture quality.

When considered from this viewpoint, non-woven fabrics having comparatively good ventilation characteristics and low pressure drop are conventionally used as the ventilation filter medium.

However, ventilation filter media formed from a non-woven fabric or the like has an 80% collection efficiency with respect to 0.1 micrometer particles, and because the pore size thereof is large, cannot completely prevent fungal contamination even if the filter is mounted after the culture medium is sterilized, and in particular cannot completely prevent fungus such as Trichoderma from being propagated.

In addition, when other fungi have propagated inside the culture container, the other fungi propagated inside the culture container will pass through the ventilation filter media and leak out into the outside air and contaminate other nearby containers, mites propagated inside culture containers contaminated with other fungi will enter other culture containers, and other fungi, mites, and the like in the other culture containers will continue to spread.

DISCLOSURE OF THE INVENTION

An object of the present invention is to provide a ventilation filter medium that serves to exchange carbon dioxide gas in a culture container with atmospheric air, and prevent the contamination of sterilized culture medium inside the culture container with fungi, mites, and the like. In addition, another object of the present invention is not limited to culture containers, and is to provide a ventilation filter medium employed in applications requiring air permeability with a space that is cut off from outside air.

Furthermore, another object of the present invention is to provide a culture container and a cap for the culture container that includes this type of ventilation filter medium.

In a first aspect of the present invention, a ventilation filter medium for a container has a plurality of micropores with a pore diameter between 0.1 and 50 micrometers. The pore diameter of the ventilation filter medium is preferably between 0.1 to 10 micrometers.

The ventilation filter medium of the present invention is preferably a medium that is obtained by increasing the collection efficiency of a conventional non-woven fabric, a medium formed from glass fibers, a medium formed from a porous polytetrafluoroethylene (PTFE) film, however a medium that is formed from a porous PTFE film which maintain a high collection efficiency, and has a reduce pore diameter and pressure drop is more preferred.

The ventilation filter medium of the present invention includes a plurality of micropores, and thus has a higher collection efficiency that conventional ventilation filter media, and can for example control contamination of objects stored in a container by fungus, and allows objects to be kept and stored in a container in a sterile state for a long period of time. In addition, with the ventilation filter medium of the present invention, for example, secondary infections can be prevented in used objects that are kept inside this type of container and reused because the interior of the container can be reliably sterilized. In particular, the ventilation filter medium that employs PTFE and described below in the fourth aspect of the present invention can be rinsed out without hindering the filter because of the water-repellent qualities of the PTFE.

A ventilation filter medium having these special characteristics can for example be employed in a storage container that serves to store medical instruments (particularly surgical instruments), and a sterile container that serves to process surgical instruments that are in less than a sterile state. Note that with this type of sterilized container, contamination due to fungus and the like is prevented in surgical instruments by, for example, passing the instruments through a cycle in which the instruments are stored in the container, the instruments are removed from the container and used in surgery, are rinsed off after surgery, and sterilized in the container, in this order.

In addition, other than the storage container and the sterile container noted above, other containers in which the ventilation filter medium of the present invention can be employed include, for example, ① a package that serves to store disposable medical instruments, ② a storage container that serves to store microorganisms or inoculum, ③ a growing container for growing insects, ④ a compressed air line that supplies air for medical use, and the like.

The package of ① stores, for example, disposable surgical gowns, instruments, and the like that can be sterilized in an autoclave and stored as is. Here, the filter medium of the present invention effectively deals with changes in internal pressure after sterilization in an autoclave. In particular, a filter medium that employs PTFE is favorably employed because it has good air permeability and high collection efficiency.

With the storage container of ②, air permeability that allows microorganisms, inoculum, and the like to breath can be ensured, and contamination by other fungi, mites, and the like can be prevented, by means of the filter medium of the present invention.

The growing container of ③ can be employed to grow insects such as rhinoceros beetles and the like inside a container for cultivating, for example, mushrooms and the like (a culture container of the first and second embodiments described below), and even in this situation, the filter medium of the present invention can ensure air permeability and prevent microbial contamination.

With the air line of ④, the filter medium of the present invention is employed for the purpose of protecting patients from minute particles, microbes, and the like inside compressed air cylinders, and in this situation, is effective for providing sterile or bacteria free air to patients.

In a second aspect of the present invention, a ventilation filter medium for a culture container is the ventilation filter medium for a culture container according to the first aspect, in which the ventilation filter medium has a plurality of micropores with a pore diameter between 0.1 and 50 micrometers.

This ventilation filter medium is mounted on, for example, the opening of a culture container, but is capable of exchanging carbon dioxide gas inside the culture container and atmospheric air because it has a plurality of micropores. On the other hand, this ventilation filter medium can prevent contamination by harmful insects such as mites or the like because the pore diameter of the micropores is 50 micrometers or less. For example, contamination by mites such as Tyrophagus putrescentiae, which have a body length of 350 micrometers, can be prevented.

Note that in the present invention, the term "culture container" includes culture bottles, culture bags formed into a bag shape, and the like, and have a space in the interior thereof in which mushrooms or other plants can be cultivated.

In a third aspect of the present invention, a ventilation filter medium for a culture container is the ventilation filter medium for a culture container according to the second aspect, in which the ventilation filter medium has a collection efficiency of 99% or greater for particles having diameters between 0.1 and 0.2 micrometers, and a pressure loss between 20 Pa and 200 Pa when air permeates the filter medium at a rate of 5.3 cm/sec.

This type of ventilation filter medium can exchange carbon dioxide gas and outside air, and can more reliably prevent contamination by fungi, mites, and the like due to its high collection efficiency. With respect to the pressure loss of 200 Pa or less, a pressure loss greater than 200 Pa is not preferred because problems will be created in the exchange of carbon dioxide gas inside the culture bottle with outside air.

In a fourth aspect of the present invention, a ventilation filter medium for a culture container is the ventilation filter medium for a culture container according to the second or third aspect, in which the ventilation filter medium is formed from a porous film composed of polytetrafluoroethylene.

As noted above, a porous PTFE film maintains a high collection efficiency while achieving a low pressure loss, and thus is more preferably employed as the ventilation filter medium of the present invention. With this ventilation filter medium, the pore diameter is smaller than other ventilation filter media such as non-woven fabrics or the like, and thus contamination by mites can be more reliably prevented.

Note that it is preferable that the porous film composed of PTFE to be employed is obtained by, for example, paste extruding a compound made by adding a lubricant to a PTFE fine powder and curing the same, forming a film by calendaring, and stretching this film in one axis and more preferably two axes.

In a fifth aspect of the present invention, a ventilation filter medium for a culture container is the ventilation filter medium for a culture container according to the fourth aspect, in which the ventilation filter medium further comprises an air permeable support member that is laminated onto at least one surface of the porous film.

The morphological stability of the porous PTFE film will increase and its ability to be handled will be superior because an air permeable support member is laminated thereto. Here, when this type of medium is used in particular, it will be capable of exchanging carbon dioxide gas with outside air which preventing contamination with fungi, mites, and the like.

In a sixth aspect of the present invention, a ventilation filter medium for a culture container is the ventilation filter for a culture container according to the fifth aspect, in which the air permeable support member is a non-woven fabric having a core/sheath structure.

Methods of laminating the porous PTFE film to the air permeable support member include a method in which an adhesive is employed and a method in which heat fixing is employed. However, a more convenient method of laminating is the heat fixing method, and thus from the perspective of preventing the generation of wrinkles during heat fixing, damage to the porous film due to the generation of wrinkles will be reduced, and lamination can be simply performed, by employing a non-woven fabric that has a core/sheath structure as the air permeable support member. With this type of non-woven fabric, damage to the porous film from the non-woven fabric when lamination by heat fixing is performed can be effectively prevented by, for example, employing a material in which the fusing point of the sheath portion is lower than the core portion.

In a seventh aspect of the present invention, ventilation filter medium for a culture container is the ventilation filter medium for a culture container according to any of the second to sixth aspects, in which the PF value of the ventilation filter medium exceeds 22, and the PF value is calculated by means of the following formula from a pressure loss measured when air permeates the ventilation filter medium at a rate of 5.3 cm/sec and a collection efficiency measured when silica particles having a particle diameter between 0.1 and 0.2 micrometers are employed:

$$PF=[-\log(\text{permeability}(\%)/100)/(\text{pressure loss (Pa)}]\times 1000$$

(Here, permeability (%)=100 −collection efficiency (%)) [Formula 1]

A conventional porous PTFE film employed as a filter medium will have a small pore size and a high collection efficiency, but will also have a high pressure loss. Because of this, when a conventional filter medium composed of a porous PTFE film is employed as a ventilation filter medium, contamination by fungi, mites, and the like can be prevented, but there will be situations in which the exchange of carbon dioxide gas inside the culture container with outside air cannot be adequately carried out.

On the other hand, as shown in Japanese Published Patent Application No. H03-504867, when a porous PTFE film that has a small pressure loss and has an adequate level of air exchange capabilities is employed as a ventilation filter medium, the collection efficiency thereof will be low, and contamination by fungi cannot be completely prevented.

Because of this, a conventional filter medium having a porous PTFE film has not been adopted as the filter medium used inside the cap of a culture bottle.

However, as shown in Japanese Published Patent Application No. 2001-170461, a filter medium has recently been developed that includes a porous PTFE film and has capabilities that exceed a PF value of 22. With this filter medium, even though the pressure loss thereof is low, the pore diameter thereof can be reduced and the collection efficiency thereof can be increased, and thus even if the pressure loss is low when an adequate exchange of carbon dioxide gas with outside air occurs, contamination by fungi, mites, and the like can be prevented.

Accordingly, with the present invention, a filter medium that includes a porous PTFE film having high performance capabilities is used as a ventilation filter medium for a culture container, e.g., a ventilation filter medium for a cap mounted on a culture bottle or for a culture bag. It was previously thought that this type of ventilation filter medium could not be used in these applications. This ventilation filter medium can simultaneously maintain the ability to exchange carbon dioxide gas inside the culture container with outside air, and completely prevent contamination of a sterilized culture medium with fungi, mites, and the like.

In an eighth aspect of the present invention, a ventilation filter medium for a culture container is the ventilation filter medium for a culture container according to the third or seventh aspect, in which the pressure loss is between 50 Pa and 150 Pa.

Here, a medium having a pressure loss in this numerical range will maintain its ability to exchange gas while preventing contamination by fungi and the like. The pressure loss is under 150 Pa because when the pressure loss is greater than 150 Pa the collection efficiency will be reduced, and contamination by fungi cannot be completely stopped.

In a ninth aspect of the present invention, a ventilation filter medium for a culture container the ventilation filter medium for a culture container according to any of the second to eighth aspects, in which the culture container is employed for cultivating mushrooms.

With the artificial cultivation of mushrooms, as noted above, it is easy for carbon dioxide gas to be generated inside the culture container and accumulate therein, and thus it will be necessary to exchange this gas with outside air at a suitable frequency, and also necessary to prevent contamination by fungi, mites, and the like. This medium includes a plurality of micropores and excels at gas exchange and preventing contamination by fungi and the like, and thus is suitable even for this type of mushroom cultivation.

In a tenth aspect of the present invention, a container includes a container unit and a ventilation filter medium. The container unit includes an opening therein, and the ventilation filter medium is the medium according to any of the first to ninth aspects and mounted on the opening.

This container excels at gas exchange and preventing contamination by fungi and the like because a ventilation filter medium having a plurality of micropores is mounted on the opening. Note that in situations in which a culture bag is employed as the container, for example, a hole provided in the side surfaces of the bag is included as an opening of the container in the present invention.

In an eleventh aspect of the present invention, a cap for a container is mounted on an opening of the container, and includes a cap unit that is arranged on a hole in the container and a ventilation filter medium. A hole is provided in the cap unit, and the ventilation filter medium is the ventilation filter medium according to any of the first to ninth aspects and mounted on the hole in the cap unit.

This cap for a container excels at gas exchange and preventing contamination by fungi and the like because a ventilation filter medium having a plurality of micropores is mounted on the hole.

BEST MODE OF WORKING THE INVENTION

First Embodiment

Figure 1:
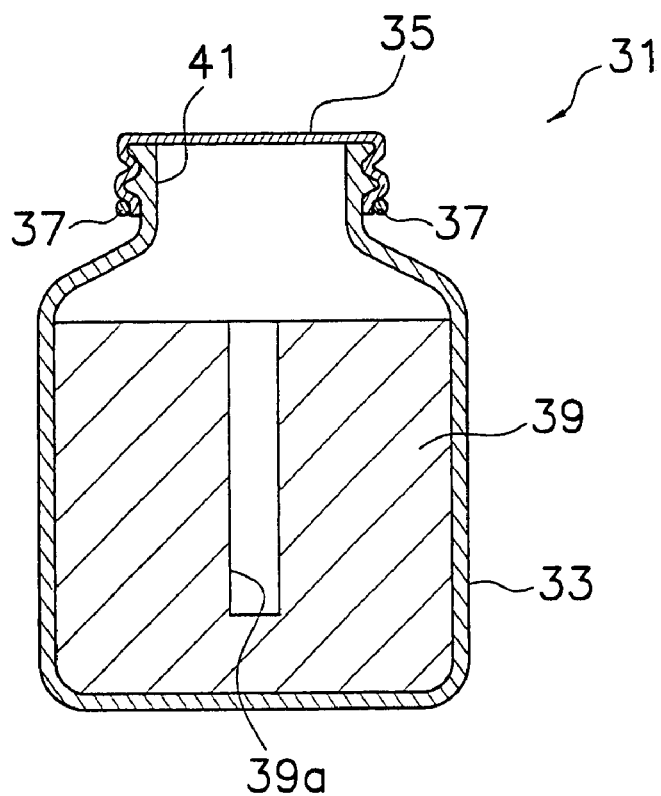
FIG. 1 is a longitudinal sectional view of a culture bottle according to a first embodiment of the present invention.

FIG. 1 shows a culture bottle 31 which employs a first embodiment of the present invention.

The culture bottle 31 is employed in the cultivation of mushrooms, and includes a bottle unit 33 and a ventilation filter medium 35.

The bottle unit 33 is a container made from a resin such as polypropylene (hereinafter referred to as PP) or the like, and has an opening 41 provided in the upper portion thereof. The interior of the bottle unit 33 has a culture medium 39 stored therein. Examples of the culture medium 39 include powdered nutrients such as sawdust, rice bran, wheat bran, corn bran, and the like mixed with a predetermined quantity of water. An inoculation hole 39a is formed in the central portion of the culture medium 39, and serves as a location to place the mushroom inoculum. Note that instead of the inoculation hole 39a, a configuration can be adopted in which an object composed of a mixture of the aforementioned powdered nutrients and a synthetic resin in accordance with need and formed into the shape of a sheet or a cylinder is inoculated and then buried in the culture medium 39.

The ventilation filter medium 35 is a sheet member that is mounted on the opening 41 of the bottle unit 33, and functions to both allow gas exchange and to prevent contamination with other fungi, mites, and the like. In the present embodiment, the ventilation filter medium 35 is composed of a porous PTFE film and a non-woven fabric that is laminated on both sides of the porous PTFE film by heat fusion. The non-woven fabric is not limited to heat fusion, and may be laminated by means of an adhesive. A non-woven fabric having a core-shell structure may be employed. A ventilation filter medium 35 having this type of structure has a collection efficiency of 99% or greater for particles having diameters between 0.1 and 0.2 micrometers, and a pressure loss between 50 Pa and 150 Pa when air permeates the filter medium at a rate of 5.3 cm/sec. In addition, the ventilation filter medium 35 has a PF value that exceeds 22. Note that the PF value is a value calculated by means of the following formula, from the pressure loss measured when air permeates the filter medium at a rate of 5.3 cm/sec and the collection efficiency measured when silica particles having a particle diameter between 0.1 and 0.2 micrometers are employed.

PF=[−log(permeability (%)/100)/(pressure loss (Pa)]×1000

(Here, permeability (%)=100 −collection efficiency (%))  [Formula 1]

In addition, the ventilation filter medium 35 is mounted on the opening 41 by means of an elastic fastening member 37 such as a rubber band or the like in the present embodiment, but may be directly adhered to the opening 41 by means of an adhesive.

Second Embodiment

Figure 2:
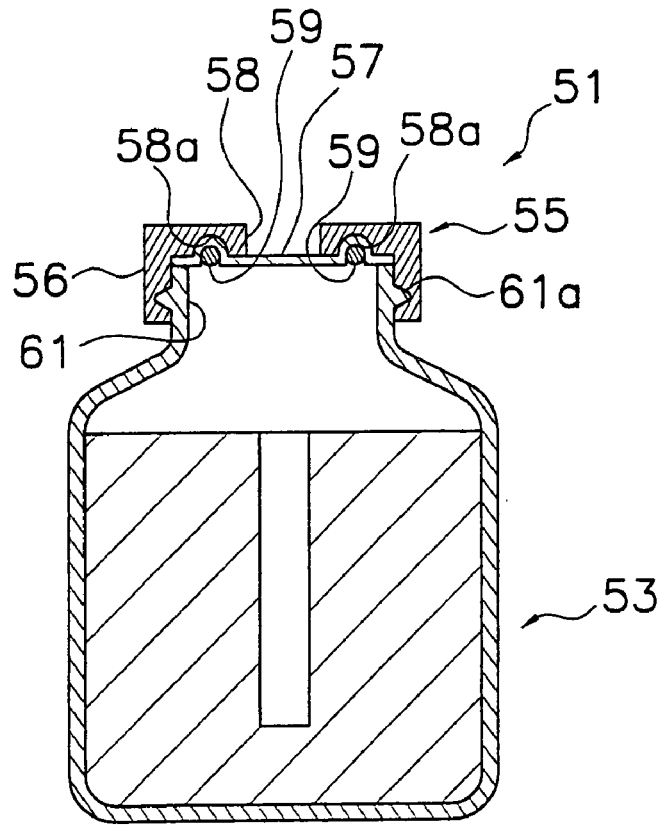
FIG. 2 is a longitudinal sectional view of a culture bottle according to a second embodiment of the present invention.

FIG. 2 shows a culture bottle 51 which employs a second embodiment of the present invention.

The culture bottle 51 includes a bottle unit 53 and a cap 55.

The bottle unit 53 is substantially the same as the bottle unit 33 of the aforementioned first embodiment, and in the present embodiment a convex portion 61a that serves to mount the cap 55 on the outer periphery of an opening 61. The convex portion 61a may also be a threaded portion that is formed in a spiral shape such that the cap 55 can be screwed thereon.

Figure 3:
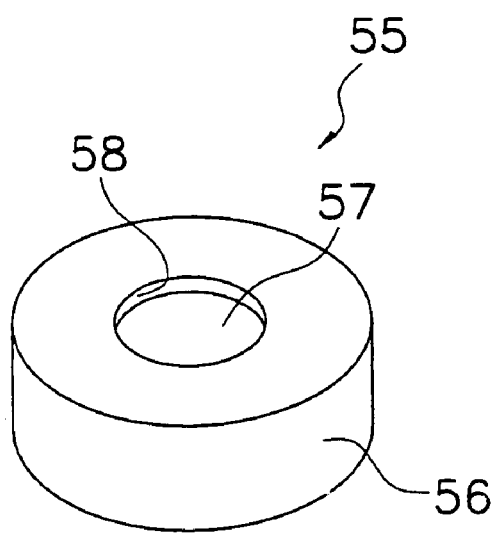
FIG. 3 is a perspective view of a cap for the culture bottle according to the second embodiment of the present invention.

As shown in FIG. 3, the cap 55 includes a cap unit 56, and a ventilation filter medium 57 that is placed inside the cap unit 56. The cap unit 56 is a lid member that is mounted on the opening 61 of the bottle unit 53, and includes a hole 58 in which the ventilation filter medium 57 is mounted. An annular groove 58a that serves to accept the ventilation filter medium 57 and a pressing ring 59 is formed in the lower surface of the hole 58.

The ventilation filter medium 57 is the same as that employed in the first embodiment, and in the present embodiment is mounted in the hole 58 by pressing the pressing ring 59 into the annular ring 58a of the cap unit 56 via the outer peripheral portion of the ventilation filter medium 57. Examples of the method of mounting the ventilation filter medium 57 include directly adhering the outer periphery of the ventilation filter medium 57 to the inner peripheral surface of the cap unit 56, or mounting the ventilation filter medium 57 such that it is interposed between the cap unit 56 and a ring shaped member that can be mounted from the inner peripheral side of the cap unit 56. However, the present invention is not particularly limited to these mounting methods.

Third Embodiment

Figure 4:
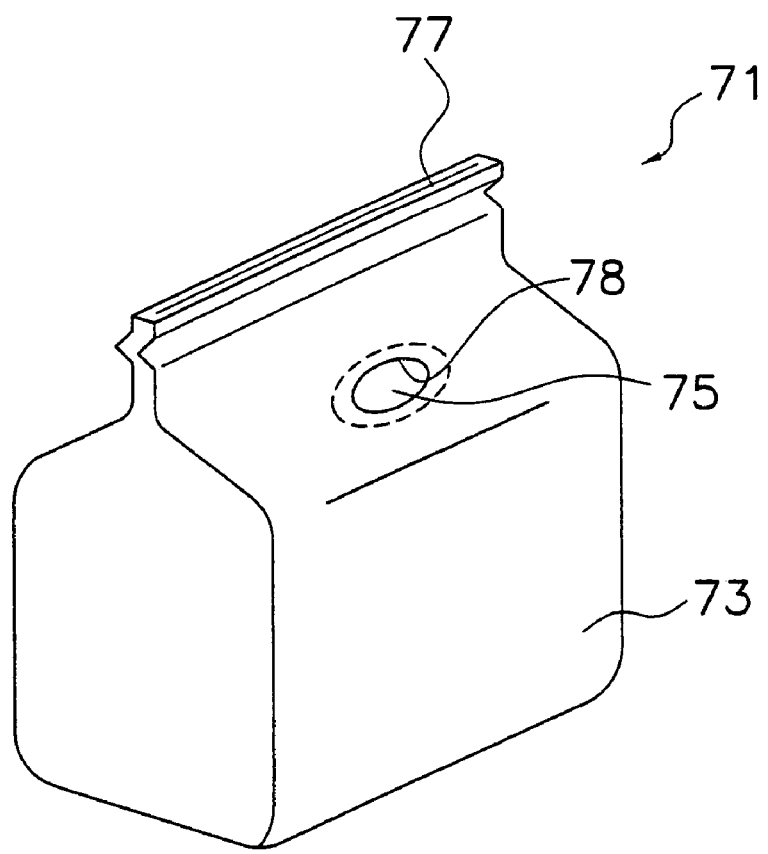
FIG. 4 is a perspective view of a culture bag according to a third embodiment of the present invention.

FIG. 4 shows a culture bag 71 which employs a third embodiment of the present invention.

The culture bag 71 includes a bag unit 73 and a ventilation filter medium 75.

An open/close portion 77 that can be sealed and unsealed is arranged on the upper end of the bag unit 73, and a culture medium 79 can be placed in the bag unit 73 when the open/close portion 77 is open. A hole 78 in which the ventilation filter medium 75 is mounted is arranged in a portion of the bag unit 73 that is slightly below the open/close portion 77. In the present embodiment, the hole 78 is arranged in one location, but may be arranged in a plurality of locations in accordance with need.

The ventilation filter medium 75 is the same as the ventilation filter medium 35, 55 employed in the aforementioned embodiments, and in the present embodiment, as shown in the figure, the ventilation filter medium 75 is attached to the hole 78 from the inner peripheral side of the bag unit 73. Note that a variety of methods of mounting the ventilation filter medium 75 to the bag unit 73 can be used, and is not particularly limited.

Examples

[Pressure Loss (Pa) of Ventilation Filter Media Having a Porous PTFE Film]

Measurement samples of ventilation filter media having a PTFE porous film were set in a filter holder having a diameter of 100 mm, the inlet sides of the media were pressurized with a compressor, and the flow rate of the air that permeated through the media was adjusted to 5.3 cm/sec with a flow meter. Pressure loss at that time was measured with a manometer.

[Collection Efficiency (%) of Ventilation Filter Media Having a Porous PTFE Film]

Measurement samples of ventilation filter media having a PTFE porous film were set in a filter holder having a diameter of 100 mm, the inlet sides of the media were pressurized with a compressor, and the flow rate of the air that permeated through the media was adjusted to 5.3 cm/sec with a flow meter. In this state, silica particles having a particle size of 0.1 to 0.2 micrometers and a particle concentration of 108/300 ml flowed from the upstream side of the media, the number of particles having a particle size of 0.1 to 0.2 micrometers that permeated the media were counted with a particle counter (PMS LAS-X-CRT, manufactured by PARTICLE MEASURING SYSTEM INC. (PMS)) arranged on the downstream of the media, and the number of particles on the upstream side and the downstream side of the media were compared. In other words, when the particle concentration on the upstream side of a measurement is represented by Ci and the particle concentration on the downstream side of the measurement sample is represented by Co, the collection efficiency of the measurement sample was calculated by the following formula:

Collection efficiency (%)=(1−Co/Ci)×100  [Formula 2]

[PF Value of Ventilation Filter Media Having a Porous PTFE Film]

The PF value of the ventilation filter media having a porous PTFE film was determined by substituting the pressure loss and the collection efficiency of the ventilation filter media having a porous PTFE film into the following formula.

PF=[−log(permeability (%)/100)/(pressure loss (Pa)]×1000

(Here, permeability (%)=100 −collection efficiency (%))  [Formula 1]

[Production of Ventilation Filter Media Having a Porous PTFE Film]

First, 406 ml of a hydrocarbon oil (Isopar, a product of Esso Petroleum Co.) as an liquid extrusion assistant were added per 1 kg of homo-PTFE fine powder having a number average molecular weight of 6,500,000 (POLYFRON FINE POWDER F-104U, a product of Daikin Industry Co.), and were mixed together.

Next, this mixture was molded into a rod shape by paste extrusion. Then, this rod-shaped formation was formed into a film shape by calendar rolls heated to 70° C. to obtain a PTFE film. The film was passed through a hot air drying oven at 250° C. to dry and remove the extrusion assistant, thereby obtaining a non-sintered PTFE film having an average thickness of 200 micrometers and an average width of 150 mm.

Figure 5:
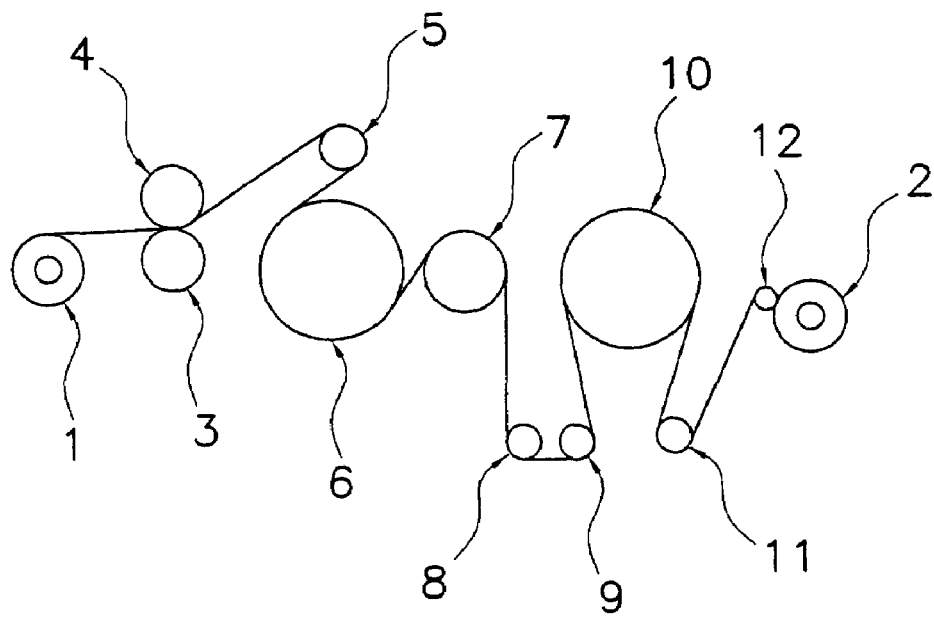
FIG. 5 is a schematic diagram of a device employed to elongate a PTFE film in the longitudinal direction.

This unsintered PTFE film was stretched so as to be 15 times larger in a longitudinal direction using a device shown in FIG. 5. The non-sintered film was set on a roll 1, and the elongated film was wound onto a take-up roll 2. Stretch temperature was 250° C. In FIG. 5, 3 to 5 are rolls, 6, 7 are heating rolls, and 8 to 12 are rolls.

Figure 6:
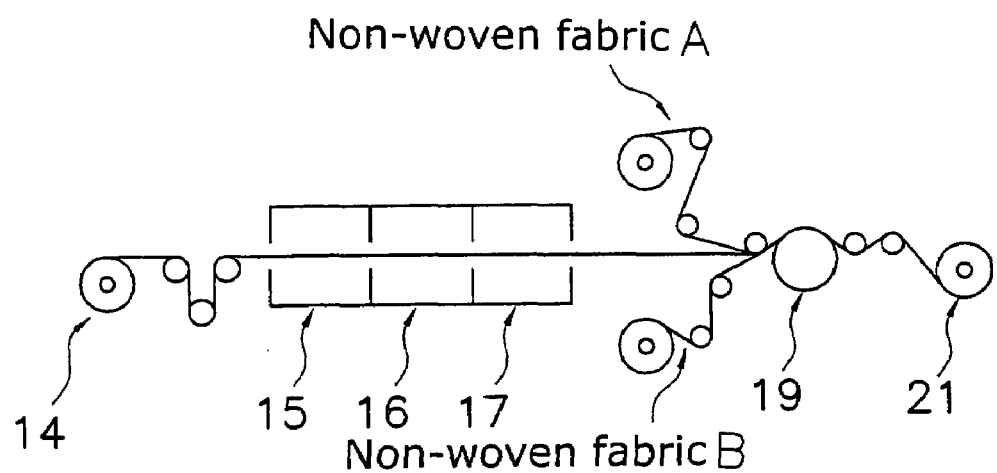
FIG. 6 is a schematic diagram of a device (left half) employed to stretch a PTFE film along its width, and a device (right half) that laminates a non-woven fabric on the PTFE film.

Next, the longitudinally stretched film obtained was elongated so as to be 45 times larger in the lateral direction by using an device (tenter) shown in the left half of FIG. 6 that can continuously grasp the film with clips, and then heat fixation was performed. At this point, the elongation temperature was 290° C., and the heat fixation temperature was 360° C.

A ventilation filter medium having a porous PTFE film was obtained by employing the non-woven fabrics A, B noted below and heat fusing them to both surfaces of the PTFE porous film noted above by means of the device shown on the right half of FIG. 6.

Non-woven fabric A: "Eleves S0403WDO", a PET/PE core/sheath non-woven fabric produced by Unitika K.K. and having a basis weight of 40 g/cm$^2$.

Non-woven fabric B: "Eleves T0403WDO", a PET/PE core/sheath non-woven fabric produced by Unitika K.K. and having a basis weight of 40 g/cm$^2$.

Note that in FIG. 6, 14 is an wind-out roll, 15 is a pre-heating zone, 16 is an elongation zone, 17 is a heat fixation zone, 19 is a lamination roll, and 21 is a take-up roll.

In addition, the conditions at which heat fusion is conducted are as follows:

Temperature: 200° C., Line speed: 15 m/min.

The pressure loss of this ventilation filter medium having a porous PTFE film was 101 Pa, the collection efficiency was 99.97%, the PF value was 34.9, and the pore diameter was 0.9 micrometer.

[Production of a Cap for a Culture Bottle]

First, a container made of PP and having a capacity of 850 cc, a bottle opening of 58 mm, and a bottle height of 165 mm, and a cap capable of being mounted on the opening of the container were prepared to serve as the culture bottle, and the cap was placed in the hole. Next, a cap A (example) was prepared in which a φ58 mm ventilation piece cut out from the ventilation filter medium having the porous PTFE film produced as described above was placed inside the cap unit, and a cap B (comparative example) was prepared in which a φ58 mm ventilation piece obtained in the same way from a commercially available non-woven fabric (collection efficiency 80%) was placed inside the cap unit.

[Cultivation Experiments]

<Mushrooms>

Beech mushrooms (bunashimeji) were employed as the mushrooms.

<Culture Medium Adjustment>

The culture medium to be placed in the culture bottle was cedar sawdust to which rice bran was added as the primary nutrient, and water was added to this mixture so as to adjust the moisture content thereof to 65%.

<Culture Medium Loading>

The moisture adjusted culture medium was loaded into culture bottles A, B (culture bottle A: a culture bottle on which cap A is mounted, culture bottle B: a culture bottle on which cap B is mounted), inoculation holes were provided in the central portion of the culture media, and then each culture bottle was sealed with caps A, B.

<Sterilization>

Culture bottles A, B were transferred to an autoclave, and were heat sterilized by heating to 120° C. with pressurized steam for 30 minutes. The culture bottles A, B were removed from the autoclave after heating was completed, and were allowed to cool to room temperature.

<Inoculation With Inoculum>

The cooled culture bottles A, B were transferred to a clean room kept at a temperature of 20 to 25° C., humidity of approximately 60%, and a cleanliness degree of 10000 or less (particles of 0.3 micrometers or less), and after the caps were removed from the culture bottles A, B, beech mushroom (bunashimeji) inoculum was inoculated in the inoculation holes and the surface of the culture media, and the culture bottles A, B were again sealed with the caps.

<Cultivation>

15 each of culture bottles A, B inoculated with the inoculum as described above were prepared, and 15 each of the culture bottles A and culture bottles B were placed in a container A and a container B (container A: a container in which the culture bottles A are stored, container B: a container in which the culture bottles B are stored). A space was maintained in the central portion of each container in order to place one separate culture bottle at a later point.

Then, in order to compare the degree to which fungal contamination has occurred from outside the culture bottles, two culture bottles X, Y contaminated with Trichoderma fungus and Tyrophagus putrescentiae (a species of mites) and on which caps A, B were respectively mounted were prepared, the culture bottles X, Y were respectively placed in the space in the central portions of containers A, B, and the containers A, B were transferred to a cultivation room kept at a temperature of 20 to 25° C. and a humidity of 65 to 70% and cultivated for 22 days.

<Fungus Removal>

After cultivation, the caps were removed from the culture bottles, inoculum was removed from the surface of the culture medium by means of a fungus removal blade, and the culture bottles were resealed.

<Growing>

The sampled culture bottles were transferred to a growing room kept at a humidity of 90 to 95% and a temperature of 15 to 20 C., and allowed to grow. At the point in which inoculum nuclei have begun to form, the caps are removed and the culture bottles are irradiated with a 100 lux light to facilitate the growth of fruiting bodies.

<Harvest>

After the removal of fungus, beech mushrooms (bunashimeji) grown for 22 days were harvested.

Note that the yield per culture bottle A, B that was not contaminated with other fungi differed by approximately 150 g.

[Comparison of Culture Bottles A and Culture Bottles B]

After cultivation was completed, each culture bottle in the containers was observed, and it was confirmed that there was no transmission of fungus to any of the 15 culture bottles A, even to the culture bottles A that were adjacent to the culture bottle X. On the other hand, it was confirmed earlier that there was fungus transmission to 6 of the 15 culture bottles B adjacent to the culture bottle Y, and thus these bottles could not be allowed to continue toward fungus removal and growth.

From the aforementioned results it was determined that by replacing a conventional ventilation filter medium mounted on a culture container with a ventilation filter medium having a porous PTFE film, the exchange of carbon dioxide gas produced in the culture bottle with outside air can be maintained, and fungal contamination can be completely prevented even in situations in which the culture bottle is in the vicinity of a culture bottle contaminated with other fungi.

[Evaluation of the Ability of the Filter to Remove Suspended Solids]

Figure 7:
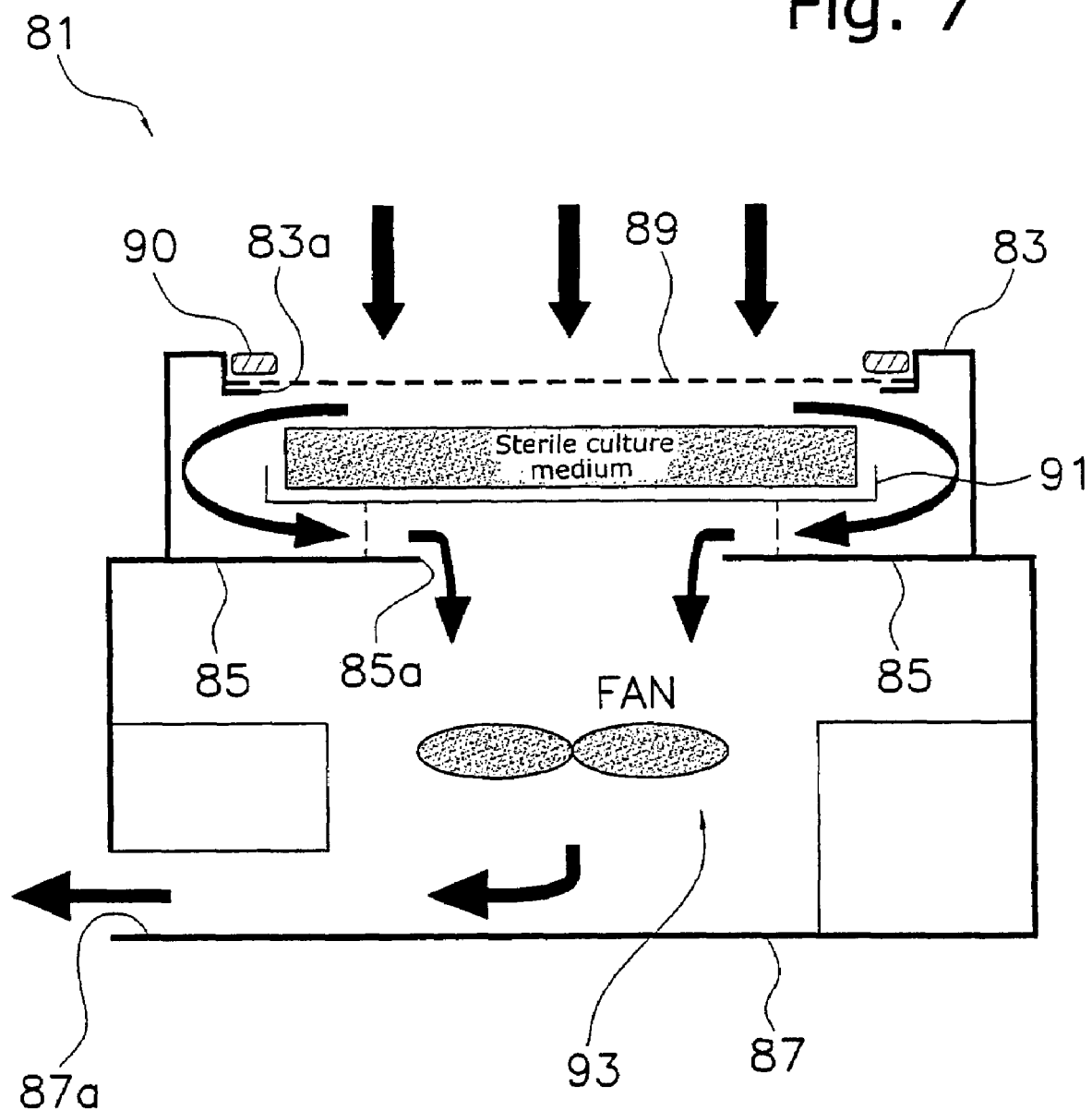
FIG. 7 is a cross-sectional view of a device employed in a test for evaluating the ability of a filter to remove suspended solids in an embodiment of the present invention.

Here, sterile culture medium was placed inside a device on which the ventilation filter medium of the present invention was mounted, and the ability of the filter to prevent fungus and mold suspended in outdoor air from entering the sterile culture medium was evaluated. A summary of a device 81 employed here is shown in FIG. 7.

The device 81 includes segments 85 that divide the air in the interior thereof into two vertical directions, and openings 83a, 85a, 87a for ventilation are respectively provided in an upper surface 83, the segments 85, and a lower end portion 87.

A ventilation filter medium 89 is mounted in the opening 83a of the upper surface 83 by means of packing material 90 as shown in the figure. A Petri dish 91 which holds sterile culture medium is disposed in the upper portion of the interior of the device 81, and a fan 93 for producing an air flow is disposed in the lower portion of the interior of the device 81.

When the fan 93 is operated in the device 81, outside air passes through the ventilation filter medium 89 and continues into the upper portion of the interior of the device 81. The outside air that has entered therein circulates around the outer periphery of the Petri dish 91 and passes through the opening 85a of the segments 85, and then flows into the lower portion of the interior and is discharged to the outside of the device 81 from the opening 87a of the lower surface 87.

The ventilation filter media 89 employed here are one which employs a porous PTFE film (Example 1), one which employs a polyurethane film (Pura-58 filter component produced by Kyozen Shoji Co.)(Comparative Example 1), one which employs a non-woven fabric (Elves T0703WDO produced by Unitika Ltd.)(Comparative Example 2), and one made of PP (SK filter)(Comparative Example 3). Note that measurements were taken even when there was no ventilation filter medium 89 mounted on the opening 83a (Comparative Example 4).

The ventilation filter medium of Example 1 complies with the ULPA (Ultra Low Penetration Air) standard, and has a collection efficiency of 99.99% for particles having a particle diameter between 0.1 and 0.2 micrometers when air permeates the medium at 5.3 cm/sec. In addition, the ventilation filter medium of Comparative Example 3 has a collection efficiency of 70 to 80% under the same conditions of Example 1, and a collection efficiency of 90% when air permeates the medium at 1.0 cm/sec.

The ventilation filter media of Example 1 and the Comparative Examples 1 to 3 were produced by cutting each to a desired size from sheets of the respective media, and were sterilized by heating in an autoclave at 150° C. for 3 hours. Then the ventilation filter media 89 corresponding to Example 1 and Comparative Examples 1 to 3 were respectively mounted in the device 81, nothing was mounting in the hole 83a for Comparative Example 4, and the respective experiments were performed.

Each device 81 prepared as described above was ① placed directly below a filter inside a clean space (a space in which the air therein was filtered by means of a HEPA (High Efficiency Particulate Air) filter) at 25° C., and after leaving each device 81 there for 3 minutes without operating the fan 93, the Petri dish 91 was removed from each device 81 and left for 5 days at a temperature suitable for the mushrooms being cultured (27 to 30° C. for beech mushrooms (bunashimeji)); and ② placed directly below a filter in a clean room at 25° C., the fan 93 was operated to pass 300 liters of outside air therethrough at a speed of 100 liters/min, and then the Petri dish 91 was removed from each device 81 and left for 2 days at 30° C.

The results of the aforementioned experiments ①, ② are shown in Table 1.

TABLE 1

| | Experiment ① | Experiment ② |
|---|---|---|
| Comparative Example 1 | Large amount of suspended fungi, mold adhered to dish | Large amount of suspended fungi, mold adhered to dish |
| Comparative Example 2 | Large amount of suspended fungi, mold adhered to dish | Large amount of suspended fungi, mold adhered to dish |
| Comparative Example 3 | Small amount of suspended fungi, mold adhered to dish | Large amount of suspended fungi, mold adhered to dish |
| Comparative Example 4 | No suspended fungi, mold adhered to dish | Small amount of suspended fungi, mold adhered to dish |
| Example 1 | No suspended fungi, mold adhered to dish | Very small amount of suspended fungi, mold adhered to dish |

[Other Embodiments]

(a) The ventilation filter medium, culture container, and cap of the present invention may be employed to cultivate something other than mushrooms.

(b) The ventilation filter medium may be one in which a non-woven fabric is laminated to only one surface of the porous PTFE film, or one which is the porous PTFE film itself.

(c) The ventilation filter medium of the present invention may, for example, be employed in a storage container that stores food and the like, a storage container that stores weakened animals and the like, a gas mask that is mounted on a person's face, and the like.

INDUSTRIAL APPLICABILITY

According to the present invention, a ventilation filter medium having a plurality of micropores whose hole diameter is smaller than a predetermined value, and thus carbon dioxide produced inside a culture container can be exchanged with outside air while contamination of the interior of the culture container with fungi, mites, and the like can be completely prevented.

The invention claimed is:

1. A ventilation filter medium for a culture container comprising:

a plurality of micropores having a pore diameter between 0.1 and 50 micrometers, wherein a PF value of the ventilation filter medium exceeds 22, the PF value calculated by means of the following formula from a pressure loss measured when air permeates the ventilation filter medium at a rate of 5.3 cm/sec and a collection efficiency measured when silica particles having a particle diameter between 0.1 and 0.2 micrometers are employed:

PF=[−log(permeability (%)/100)/(pressure loss (Pa)]×1000

(permeability (%)=100−collection efficiency (%).

2. The ventilation filter medium for a culture container according to claim 1, wherein
the pressure loss is between 50 Pa and 150 Pa.

3. A container, comprising:
a container unit having an opening therein; and
a ventilation filter medium according to claim 1 that is mounted on the opening.

4. A cap for a container that is mounted on an opening of the container, the cap comprising:
a cap unit that is arranged on the opening; and
a ventilation filter medium according to claim 1 that is mounted on a hole in the cap unit.

* * * * *